United States Patent [19]

Feuerherdt

[11] Patent Number: 5,669,663
[45] Date of Patent: Sep. 23, 1997

[54] QUICK-ACTION FASTENING DEVICE FOR A CHILD'S SEAT IN A VEHICLE

[75] Inventor: Ingo Feuerherdt, Kaempfelbach, Germany

[73] Assignee: Mercedes-Benz AG, Germany

[21] Appl. No.: 660,102

[22] Filed: Jun. 7, 1996

[30] Foreign Application Priority Data

Jun. 16, 1995 [DE] Germany .......... 195 21 889.2

[51] Int. Cl.⁶ .................................................. B60N 2/28
[52] U.S. Cl. .............. 297/253; 297/250.1; 297/256.1; 403/325; 403/375
[58] Field of Search ................ 297/253, 250.1, 297/256.1; 403/325

[56] References Cited

U.S. PATENT DOCUMENTS

| | | | |
|---|---|---|---|
| 649,444 | 5/1900 | Good | 403/325 X |
| 878,040 | 2/1908 | Burke | 297/250.1 |
| 2,293,094 | 8/1942 | Abbott | 403/325 X |
| 3,185,413 | 5/1965 | Walker | 403/325 X |
| 3,404,917 | 10/1968 | Smith | 297/256.1 |
| 4,756,573 | 7/1988 | Simin et al. | 297/250.1 |
| 5,344,212 | 9/1994 | Muller et al. | 297/250.1 X |
| 5,383,708 | 1/1995 | Nagasaka et al. | 297/250.1 |
| 5,466,044 | 11/1995 | Barley et al. | 297/253 X |
| 5,536,066 | 7/1996 | Sedlack | 297/250.1 |
| 5,551,750 | 9/1996 | Yoshimura | 297/250.1 |

FOREIGN PATENT DOCUMENTS

| | | |
|---|---|---|
| 0 619 202 A1 | 10/1994 | European Pat. Off. . |
| 0 694 436 A1 | 1/1996 | European Pat. Off. . |
| 2236346 | 1/1975 | France ............ 297/250.1 |
| 42 16 925 A1 | 11/1993 | Germany . |

*Primary Examiner*—Peter M. Cuomo
*Assistant Examiner*—David E. Allred
*Attorney, Agent, or Firm*—Evenson, McKeown, Edwards & Lenahan, P.L.L.C.

[57] ABSTRACT

A device for the quick-action fastening of a child's seat on a vehicle seat, has at least one plug-in connection with a plug assigned to the child's seat and a socket assigned to the vehicle seat. A locking member locks the plug which has been plugged into the socket. In order to provide a quick-action fastener for the child's seat which can easily be handled in a simple manner and without exerting force, the plug-in connection is associated with a tensioning device which, once the plug has been locked in the socket, draws the child's seat against the seat cushion and backrest of the vehicle seat.

1 Claim, 3 Drawing Sheets

QUICK-ACTION FASTENING DEVICE FOR A CHILD'S SEAT IN A VEHICLE

BACKGROUND AND SUMMARY OF THE INVENTION

The present invention relates to a device for the quick-action fastening of a child's seat on a vehicle seat having seat substructure with seat cushion and backrest, and more particularly, a device comprising at least one plug-in connection having two mutually corresponding plug-in parts, with one of the plug-in parts being assigned to the child's seat and the other of the plug-in parts being retained in a region between the seat cushion and the backrest of the vehicle seat, on one of the seat substructure and a vehicle floor.

Children's seats are generally fastened securely on the back seat by straps. Mounting and demounting are laborious tasks and, during the mounting operation, an adult is required not only to adopt an inconvenient posture, but also to exert a considerable amount of force in order to tighten the straps which secure the child's seat on the back seat. As a rule, therefore, temporary removal of the child's seat is deterred and this results in passenger space being restricted when the child's seat is not in use.

DE 42 16 925 A1 describes rigid link plates which are arranged on both sides of the child's seat. These link plates are intended for releasable engagement in two latching mechanisms which are fastened at a corresponding distance from one another on the vehicle seat. The arrangement of the latching mechanisms and link plates is such that, when the link plates have been latched into the latching mechanisms, the child's seat rests on the seat surface and against the backrest. If the aim is to achieve a safe play-free tightened fit of the child's seat on the vehicle seat, then the latching mechanisms have to be arranged such that the link plates of the child's seat latch into the latching mechanisms only once the seat and backrest pads have been pressed in to a certain extent by the child's seat. Although the mounting operation of the child's seat is simplified as a result, this operation continues to involve considerable exertion of force which is too much for smaller adults.

EP 06 19 202 A1 discloses a fastening device for a child's seat which comprises two mutually opposite link plates which project from the child's seat and have a receiving slot for a bolt arranged in a stationary manner between the seat backrest and seat cushion. In addition, a fastening angle juts out from the front of the child's seat and can be locked to an eyelet projecting from the floor. This results in the child's seat being braced merely with respect to the seat cushion of the vehicle seat on which the child's seat is positioned.

An object of the present invention is to provide a device for the quick-action fastening of a child's seat on a vehicle seat which can easily be handled in a simple manner without exerting force.

The foregoing object has been achieved according to the present invention, in the case of a device for the quick-action fastening of a child's seat, by providing that one of the plug-in parts being configured as a plug and the other of the plug-in parts being designed as a socket with a manually releasable locking member for locking the plug in the socket, and a tensioning device is associated with the plug-in connection such that when the plug has been locked in the socket, the child's seat is drawable against the seat cushion and backrest of the vehicle seat.

The quick-action fastening device according to the present invention has the advantage that the child's seat positioned on the vehicle seat can be pushed, by way of its plug-in parts, into the plug-in parts assigned to the vehicle seat, and locked, very easily and without any force being exerted. By virtue of the subsequent actuation of the tensioning device, the child's seat is then drawn up tight against the vehicle seat, with the seat and backrest pads being pressed in as a result of the actuation process. In this arrangement, the tensioning device may be designed (e.g., by virtue of favorable leverage) such that it can be actuated by only exerting a small amount of force.

In accordance with a preferred embodiment of the present invention, the tensioning device has a retaining strut and a pivot arm which is retained pivotably on the child's seat. The retaining strut is articulated, via one of its ends, on the pivot arm and bearing; at its other end is the plug-in part assigned to the child's seat. The articulation point of the retaining strut is arranged with respect to the pivot axis of the pivot arm such that, when the plug-in connection is closed, the pivot arm being transferred out of a child's-seat mounting position into a child's seat retaining position shortens the distance between the child's seat and plug-in connection. The pivot axis of the pivot arm and the articulation point of the retaining strut on the pivot arm are located with respect to one another such that, in its child's seat retaining position, the pivot arm assumes an over-dead-center position. This configuration has the advantage that a very good press fit of the child's seat on the vehicle seat is achieved with exertion of only a small amount of force, and, in the event of a crash, the child's seat can exhibit its inherent extremely high safety characteristics. In this arrangement, the over-dead-center position ensures that the press fit is not inadvertently released by pivoting of the pivot arm.

The tensioning device configuration has the additional advantage that, with the provision of two plug-in connection between the child's seat and vehicle seat and, correspondingly, two tensioning devices, in accordance with a further embodiment of the invention, the pivot arms can be designed as side supports for the bottom and thigh areas of the child. Thus, in addition to their tensioning function, the pivot arms also assume a safety function, namely that of supporting the child laterally in a shell-like manner.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
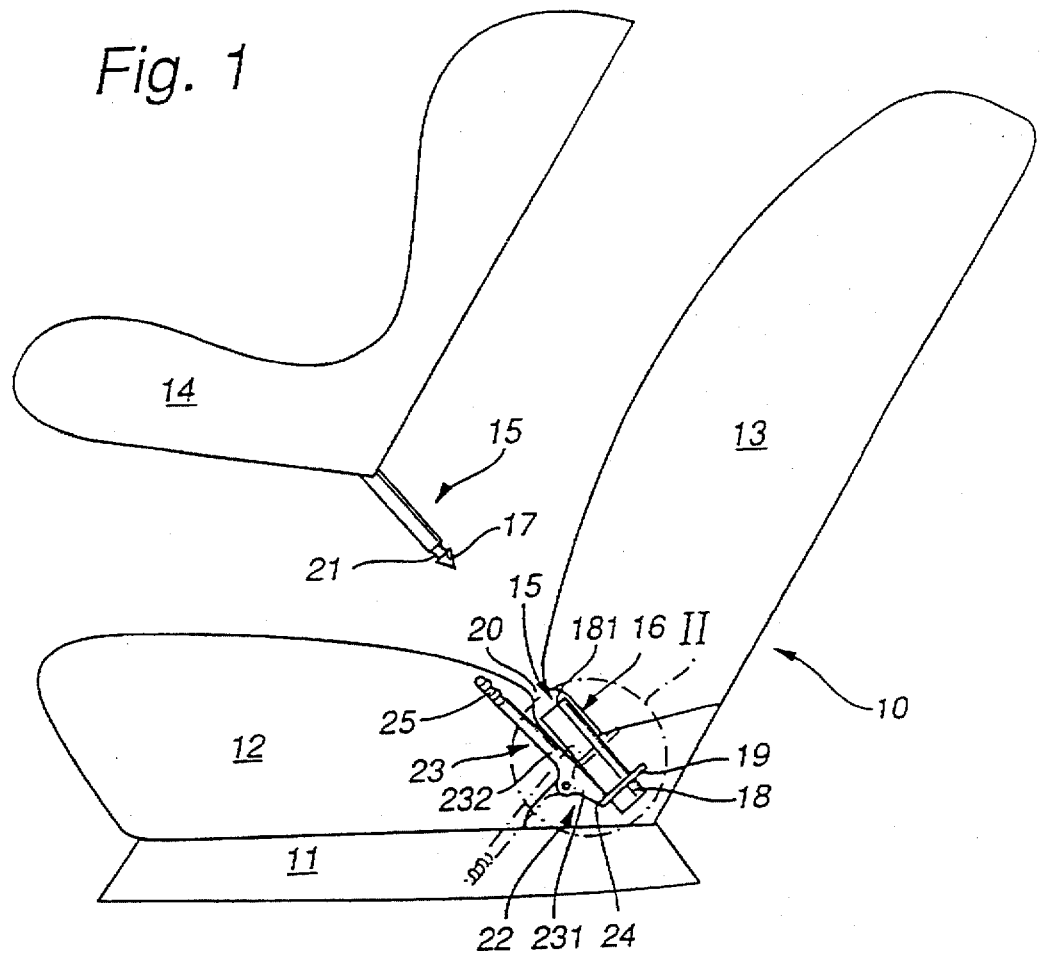
FIG. 1 is a schematic side view of a vehicle seat and of a child's seat, which is to be fastened thereon, before the mounting operation.

In the schematic view of FIG. 1, the numeral 10 designates a vehicle seat which has a seat cushion 12, fastened on a seat substructure 11, and a backrest 13 which is inclined with respect to the seat cushion. The seat substructure 11 is anchored firmly on the floor of the vehicle bodywork. In order also to carry an infant, a child's seat 14, designed as a shell-type seat, is positioned on the vehicle seat 10. Thereby, the child's seat 14 rests on the seat cushion 12 and is supported against the backrest 13, and is fastened on the vehicle seat 10 by a two-part quick-action fastening device 15.

The quick-action fastening device 15 has two plug-in connections 16 between the child's seat 14 and vehicle seat 10. The plug-in connections are arranged at a transverse distance from one another. Only one plug-in connection 16 can, of course, be seen in FIG. 1. Each plug-in connection 16 has two plug-in parts, i.e. a plug 17 and a socket 18, which are assigned to the child's seat 14 and vehicle seat 10, respectively, as well as a manually releasable locking member 19 which locks the plug 17 in the socket 18 once it has been plugged therein.

In the plug-in connection 16 shown schematically in FIG. 1, the plug 17 is arranged on the underside of the child's seat 14 so as to project obliquely therefrom. The socket 18 is arranged in the gap 20 between the seat cushion 12 and backrest 13 and, as is not shown here in any greater detail for ease of understanding, is fastened on the seat substructure 11 or on the floor of the bodywork.

Figure 2:
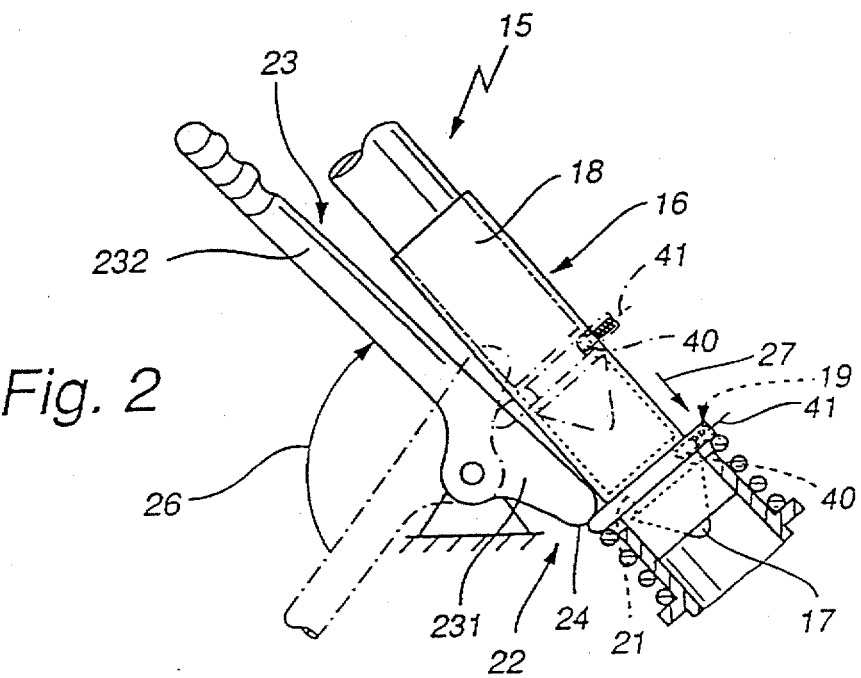
FIG. 2 is an enlarged view of the detail II shown in dot-dash circle in FIG. 1.

In FIGS. 1 and 2, the locking member 19 is shown schematically as a slide which, in order to lock the plug 17 in the socket 18, engages, by way of a pin 40 which can be drawn out counter to the spring force, into an undercut 21 formed on the plug 17. The socket 18 is arranged in the gap 20 such that, when the child's seat 14 is positioned on the vehicle seat 10, the plug 17 slides into the socket 18 and, after a slight pressure has been exerted on the child's seat 14 in the direction of the vehicle seat 10, the locking member 19 automatically latches into the undercut 21 in the plug 17. A precise representation of the method for releasing the locking member 19 in order to dismount the child's seat 14 has been dispensed with here.

Once the plug-in connections 16 have been closed, the child's seat 14 which has been mounted as described above is still positioned relatively loosely on the vehicle seat 10 and can be moved relative to the same within small limits. In order to eliminate this relative play between the child's seat 14 and vehicle seat 10, each plug-in connection 16 is provided with an assigned tensioning device designated generally by numeral 22 which can be actuated manually. Upon actuation, which takes place once the plug-in connection 16 has been locked, the tensioning device 22 draws the child's seat 14 up against the seat cushion 12 and backrest 13 of the vehicle seat 10. In the embodiment of FIGS. 1 and 2, the tensioning device 22 has a two-armed tensioning lever 23 which is mounted pivotably on the seat substructure 11 and of which one lever arm 231 bears a tensioning guide 24 at the end and the other lever arm 232 bears a handle 25 at the end. The tensioning lever 23 acts on the locking member 19 which is configured to be displaceable in the socket 18 in the axial direction of the latter.

For the mounting of the child's seat 14, the tensioning lever 23 assumes its position represented by the dot-dash lines in FIG. 2. Under the action of a compression spring (not shown in detail) the locking member 19 is transferred into a front position, in the vicinity of the plug-in opening 181 of the socket 18, which is likewise represented by dot-dash lines in FIG. 2. In this position, the locking member 19 grips the plug 17 which has been plugged into the socket 18 and locks it so that it cannot be drawn out again. The plug-in connection 16 is closed. If the tensioning lever 23 is then transferred, in the direction of arrow 26, into its position represented by solid lines in FIG. 2, then, via the tensioning guide 24, the locking member 19 is transferred, in the direction of arrow 27 out of its front position, shown by dashed lines in FIG. 2, into a rear position, remote from the plug-in opening, which is represented by solid ones. In this arrangement, the locked plug 17 is moved further into the socket 18 and the child's seat 14 is thus pressed against the seat cushion 12 and backrest 13. In the rear position, remote from the plug-in opening, the locking member 19 is blocked by the over-dead-center position of the tensioning lever 23 against moving back even in the event of a crash.

In order to remove the child's seat 14 from the vehicle seat 10, first of all the tensioning lever 23 has to be pivoted back counter to arrow direction 26. The locking member 19 is consequently released, and the stressed compression spring pushes the locking member 19 into the front position, in the vicinity of the plug-in opening, in the socket 18, this position being represented by dashed lines in FIG. 2. In this position, as regards the locking member 19, the engaged pin 40 can be released manually by pulling on an indicated part 41, with the result that plug-in connection 16 is raised. Thereafter, the child's seat 14 can be removed from the vehicle seat 10.

Figure 3:
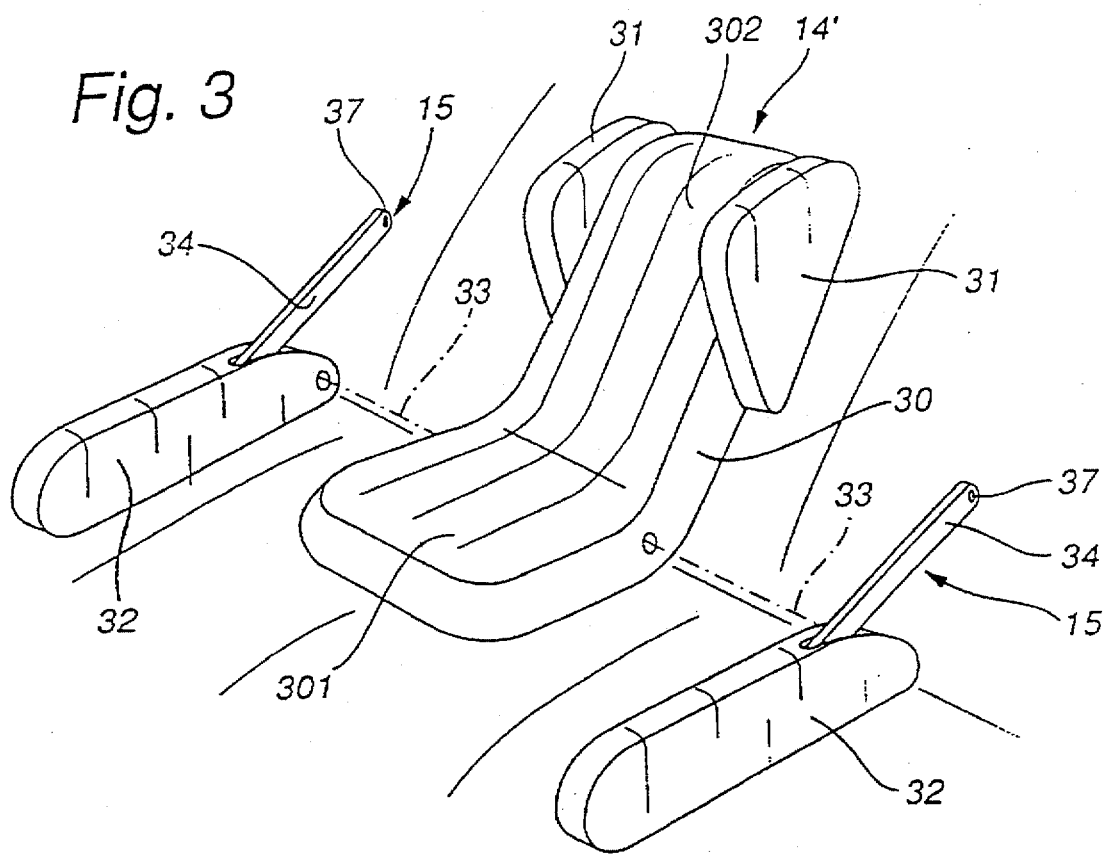
FIG. 3 is a perspective, exploded view of a child's seat in accordance with a further embodiment of the present invention.
Figure 4:
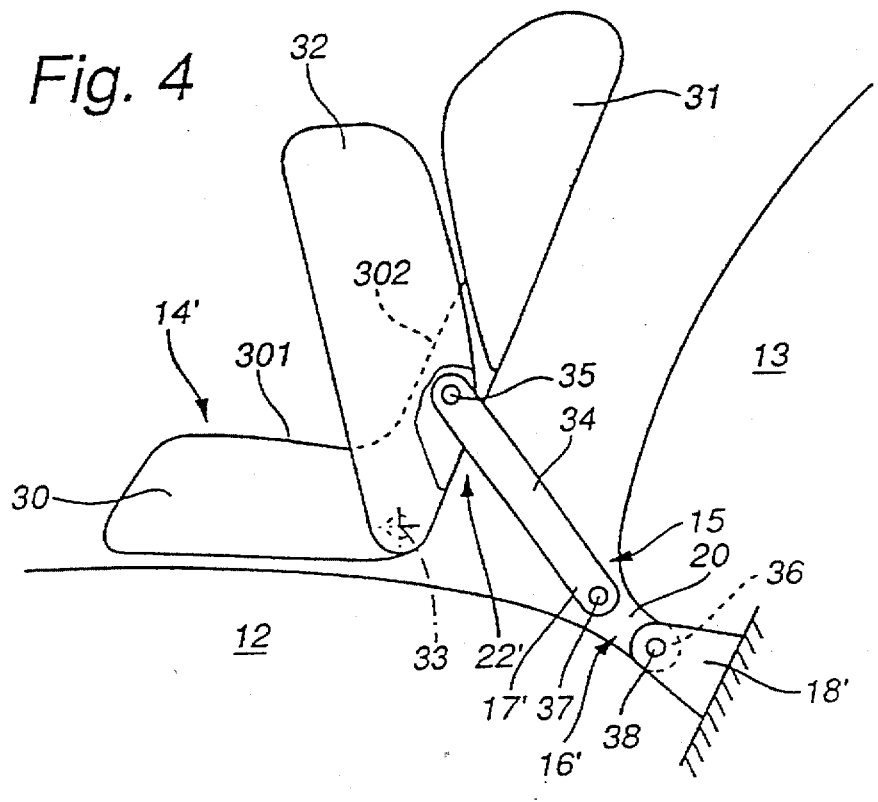
FIGS. 4 to 6 each show a detail of a vehicle seat with the child's seat which is to be fastened thereon according to FIG. 3 at three different times in the mounting operation.
Figure 5:
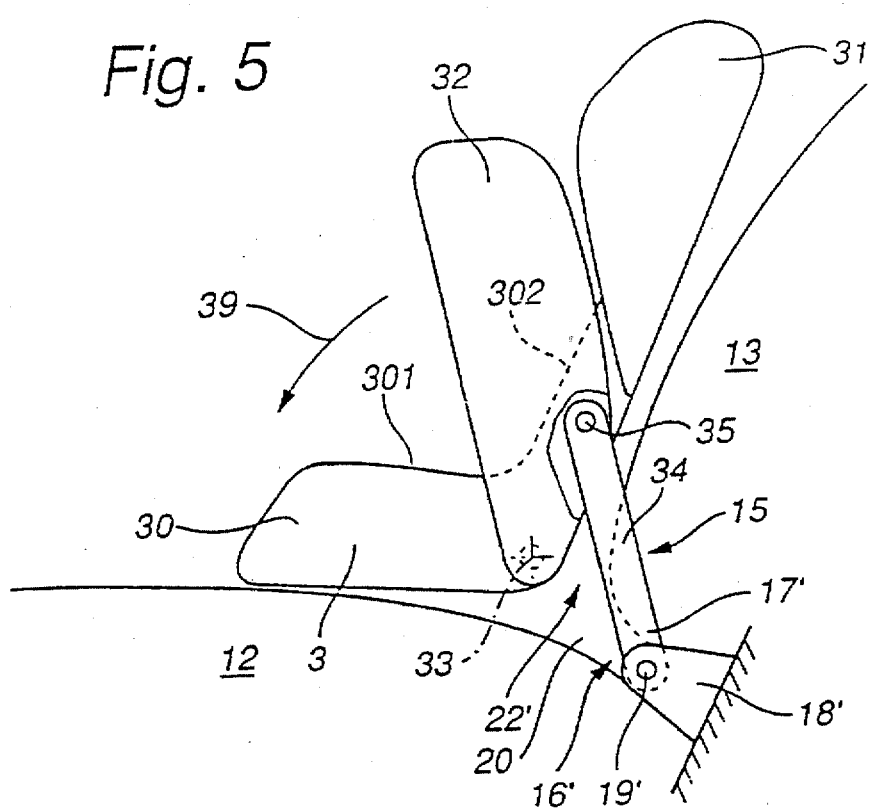
Figure 6:
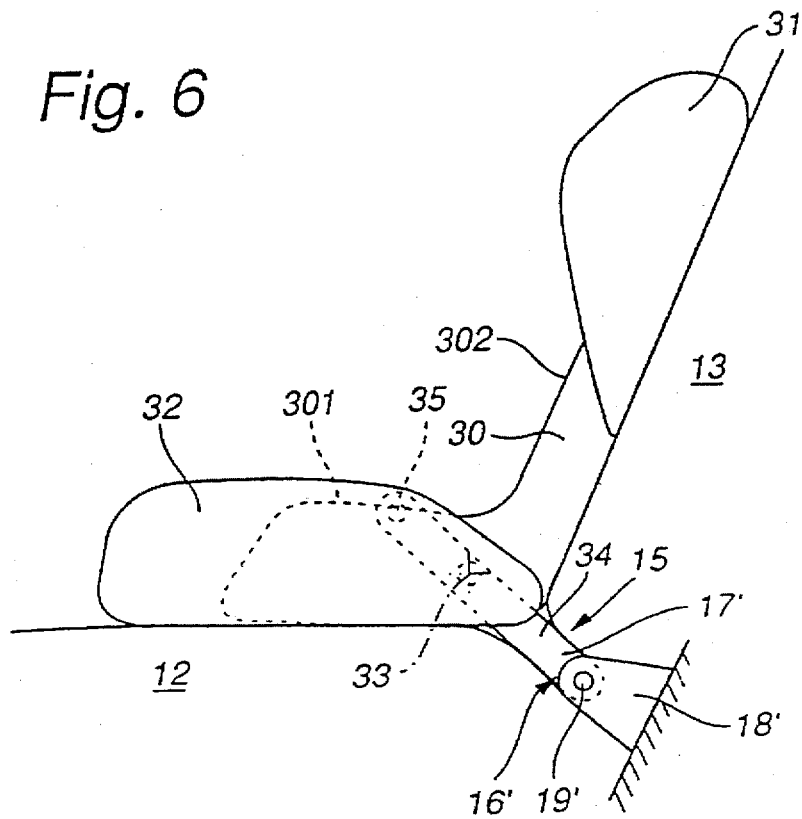

FIG. 3 represents a modified child's seat 14', which can likewise be fastened on both sides by a quick-action fastening device 15, on a vehicle seat 10 as seen in FIGS. 4–6. The child's seat 14' has a seat body 30 with seat surface 301 and backrest surface 302, and two padded wings 31 for supporting the head of the child fastened laterally at the upper end of said backrest surface 302. Furthermore, two upholstered side supports 32 are arranged laterally on the seat body 30, in the region of the seat surface 301. The side supports 32 support the bottom and thigh areas of the child placed on the child's seat 14'. The side supports 32 are pivotably held on the seat body 30 and form part of the tensioning device 22' for drawing the child's seat 14' tight up against the vehicle seat 10 once the plug-in connections 16' between the child's seat 14' and vehicle seat 10 have been locked. The pivot axes 33 of the side supports 32 are arranged in the seat body 30 on the rear region of the seat surface 301.

The plug-in connection 16' comprises plug 17', socket 18' and a locking member similar to the ones described above. The socket 18' is fastened rigidly on the bodywork and is arranged in the vehicle seat 10, in the gap 20 between seat cushion 12 and backrest 13 as seen in FIGS. 4–6. The plug-in connection 16' is represented in a simplified manner here. That is, the plug 17' is an integral part of a retaining strut 34 which is articulated on the side support 32 at articulation point 35. The socket 18' is shown in a simplified manner in FIGS. 4–6 and, at its front end, has a plug-in slot 36 whose width is selected such that the retaining strut 34 can penetrate therein by its end remote from the side supports. Arranged at this end of the retaining strut 34 is a plug-in hole 37 which, once the retaining strut 34 has been plugged into the socket 18', corresponds with aligned plug-in holes 38 in the socket 18'. The locking member (not shown here) is configured, for example, as a plug-in spindle which is guided through the plug-in holes 37, 38 and thus fixes the retaining strut 34 in a pivotable manner in the socket 18'.

In the case of the tensioning device 22' comprising retaining strut 34 and side support 32, acting as a pivot arm, the articulation point 35 of the retaining strut 34 on the side support 32 is then arranged with respect to the pivot axis 33 of the side support 32 on the seat body 30. Thus, when the plug-in connection 16' is closed, by virtue of the side support 32 being transferred out of its child's-seat mounting position represented in FIG. 4 into a child's-seat retaining position represented in FIG. 6, the distance between the seat body 30 of the child's seat 14' and the plug-in connection 16 in the gap 20 between the seat cushion 12 and backrest 13 of the vehicle seat 10 is shortened. This can be readily seen by comparing FIGS. 5 and 6. Furthermore, the articulation point 35 and the pivot axis 33 are located such that, in the child's-seat retaining position shown in FIG. 6, the side support 32 assumes an over-dead-center position, thereby preventing the side support 32 from being inadvertently pivoted back upwards into the child's-seat mounting position.

The mounting operation of the child's seat 14' is graphically seen in FIGS. 4–6. That is, the child's seat 14' is positioned on the seat cushion 12 of the vehicle seat 10 with its side supports 32 swung upwards and retaining struts 34 pivoted obliquely downwards. The two retaining struts 34 are pushed into the plug-in slots 36 in the two sockets 18' and are locked in a pivotable manner therein by a plug-in spindle being introduced through the plug-in holes 37, 38 to the mounting state illustrated in FIG. 5. The two side supports 32 are then pivoted downwards in the direction of arrow 39 in FIG. 5, the side supports 32 pivoting into an over-dead-center position and, running parallel to the seat surface 301 on the seat body 30, being positioned on the seat cushion 12 of the vehicle seat 10 as seen in FIG. 6. With this downwards pivoting movement of the side supports 32, the distance between the seat body 30 and the plug-in connection 16' is shortened. As a result, the seat body 30 is drawn up against the seat cushion 12 and backrest 13 and, finally, is then pressed against the same.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for quick-action fastening of a child's seat on a vehicle seat having a seat substructure with a seat cushion and a backrest, comprising at least one plug-in connection having two mutually corresponding plug-in parts, with one of the plug-in parts being operatively connected with the child's seat and the other of the plug-in parts adapted to be retained in a region between the seat cushion and the backrest, on one of the seat substructure and a vehicle floor, and one of the plug-in parts being configured as a plug and the other of the plug-in parts being designed as a socket with a manually releasable locking member which locks the plug in the socket, and a tensioning device operatively connected with the plug-in connection such that when the plug has been locked in the socket, the child's seat is drawn against the seat cushion and backrest of the vehicle seat, wherein the locking member is displaceably retained in the socket, and the tensioning device has a manually operable, pivotably mounted tensioning lever arranged to transfer the locking member from and to a first position, located in a vicinity of a plug-in opening of the socket, and to and from a second position remote from said plug-in opening.

* * * * *